US011989650B2

(12) United States Patent
Doggett et al.

(10) Patent No.: US 11,989,650 B2
(45) Date of Patent: May 21, 2024

(54) SALIENCY PRIORITIZATION FOR IMAGE PROCESSING

(71) Applicant: Disney Enterprises, Inc., Burbank, CA (US)

(72) Inventors: Erika Varis Doggett, Los Angeles, CA (US); David T. Nguyen, Newark, CA (US); Binghao Tang, Nanshan (CN); Hailing Zhou, Nanshan (CN); Anna M. Wolak, Seattle, WA (US); Erick Keyu Qi, Dongguan (CN)

(73) Assignee: Disney Enterprises, Inc., Burbank, CA (US)

( * ) Notice: Subject to any disclaimer, the term of this patent is extended or adjusted under 35 U.S.C. 154(b) by 816 days.

(21) Appl. No.: 17/129,204

(22) Filed: Dec. 21, 2020

(65) Prior Publication Data
US 2022/0198258 A1 Jun. 23, 2022

(51) Int. Cl.
G06N 3/08 (2023.01)
G06F 3/01 (2006.01)
G06N 3/045 (2023.01)

(52) U.S. Cl.
CPC ............ *G06N 3/08* (2013.01); *G06F 3/013* (2013.01); *G06N 3/045* (2023.01)

(58) Field of Classification Search
CPC .......... G06N 3/08; G06N 3/045; G06N 3/013
USPC ....................................................... 382/156
See application file for complete search history.

(56) References Cited

U.S. PATENT DOCUMENTS

| 8,098,730 | B2 | 1/2012 | Ma et al. |
| 9,740,949 | B1 | 8/2017 | Khosla et al. |
| 10,025,988 | B2 | 7/2018 | Yuan et al. |
| 10,387,298 | B2 | 8/2019 | Baum et al. |
| 10,503,999 | B2 | 12/2019 | Rao et al. |
| 10,672,115 | B2 | 6/2020 | Panda et al. |

(Continued)

FOREIGN PATENT DOCUMENTS

| CN | 102496023 | 8/2014 |
| CN | 103327359 | 2/2015 |

(Continued)

OTHER PUBLICATIONS

"Action Recognition Using Visual Attention" by Sharma et al. (ICLR 2016).

(Continued)

*Primary Examiner* — Gabriel I Garcia
(74) *Attorney, Agent, or Firm* — Farjami & Farjami LLP

(57) ABSTRACT

According to one implementation, a system includes a computing platform having a hardware processor and a system memory storing a software code including a trained neural network (NN). The hardware processor executes the software code to receive an input image including a pixel anomaly, identify, using the trained NN, one or more salient regions of the input image, and determine whether the pixel anomaly is located inside any of the one or more salient regions. The hardware processor further executes the software code to assign a first priority to the pixel anomaly when it is determined that the pixel anomaly is located inside any of the one or more salient regions, and to assign a second priority, lower than the first priority, to the pixel anomaly when it is determined that the pixel anomaly is not located inside any of the one or more salient regions.

20 Claims, 5 Drawing Sheets

(56) References Cited

U.S. PATENT DOCUMENTS

| | | | |
|---|---|---|---|
| 10,720,182 B2 | 7/2020 | Gonzalez-Banos et al. | |
| 2006/0050158 A1* | 3/2006 | Irie | H04N 9/646 |
| | | | 348/E9.042 |
| 2018/0249151 A1* | 8/2018 | Freeman | A61B 5/6803 |
| 2021/0304387 A1* | 9/2021 | Schroers | G06N 3/045 |
| 2021/0312213 A1* | 10/2021 | Doggett | G06V 20/46 |

FOREIGN PATENT DOCUMENTS

| | | | |
|---|---|---|---|
| CN | 108875555 A * | 11/2018 | G06K 9/00711 |
| CN | 109166093 | 9/2020 | |

OTHER PUBLICATIONS

"Co-saliency Detection via Mask-guided Fully Convolutional Networks with Multi-scale Label Smoothing" by Zhang et al. (IEEE 2019).
"Label Decoupling Framework for Salient Object Detection" by Wei et al. (IEEE/CVF 2020).
"Multi-scale Interactive Network for Salient Object Detection" by Pang et al. (IEEE/CVF 2020).
"Pyramid Spatial Context Features for Salient Object Detection" by Hui Li. (IEEE 2016).
"Recurrent Models of Visual Attention" by Mnih et al. (NIPS 2014).

* cited by examiner

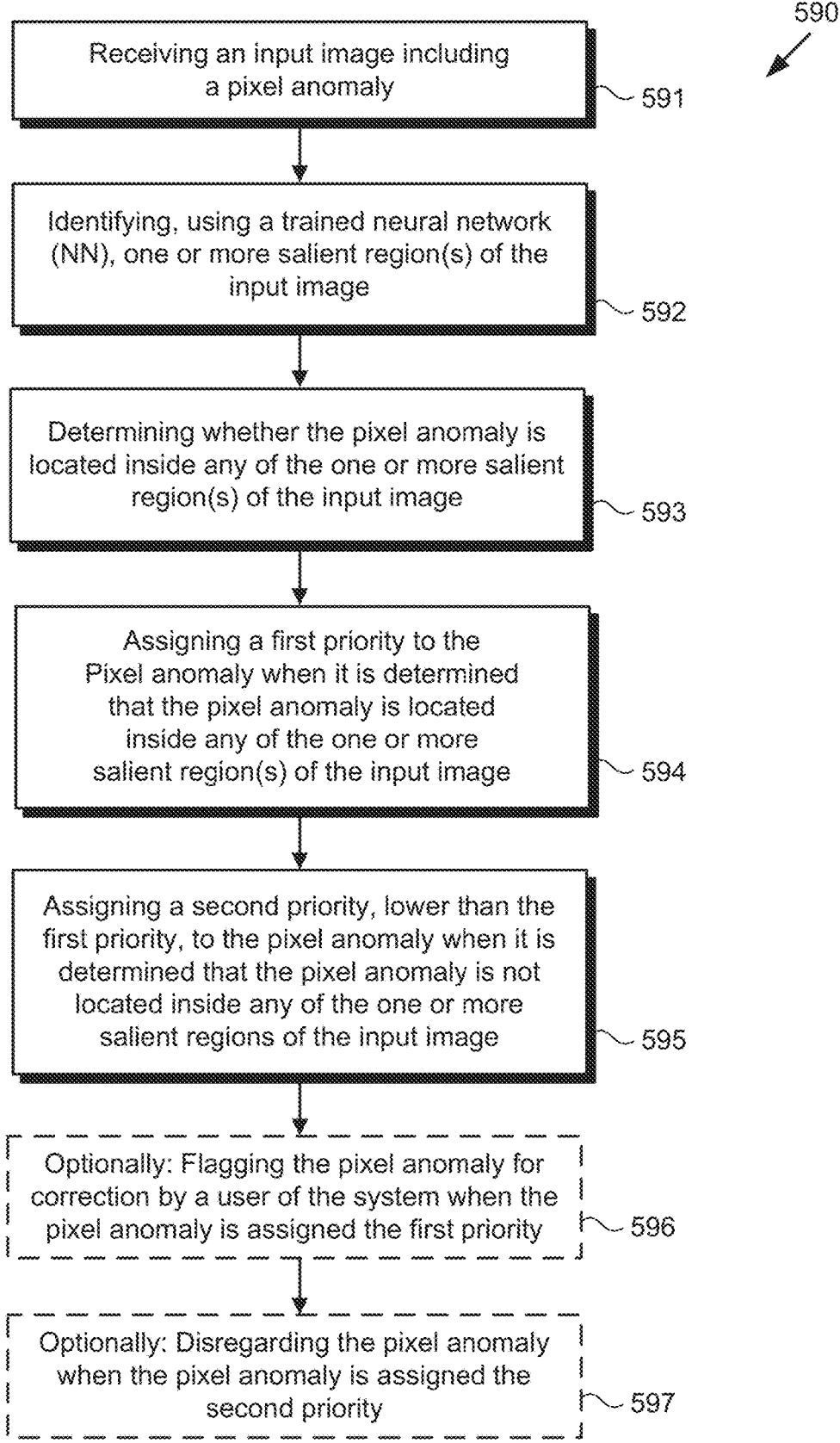

SALIENCY PRIORITIZATION FOR IMAGE PROCESSING

BACKGROUND

Pixel errors in images occur with regularity but can be difficult and costly to correct. For example, pixel anomalies in video frames can be introduced by many different processes within a video production pipeline. A final quality procedure for correcting such errors is typically done before the video undergoes final release, and in the conventional art that process is usually performed by human inspectors. Due to its reliance on human participation, pixel error correction is expensive and time consuming. However, not all pixel anomalies require correction. For example, depending on its position within an image, for example with respect to a character or foreground object, as well as to regions within an image receiving high attention by observers, some pixel anomalies may be prioritized for correction, while others may reasonably be disregarded. That is to say, not all pixel errors are of equal importance. Accordingly, there is a need in the art for an automated solution for prioritizing the correction of pixel errors in an image.

SUMMARY

There are provided systems and methods for performing saliency prioritization for image processing, substantially as shown in and described in connection with at least one of the figures, and as set forth more completely in the claims.

BRIEF DESCRIPTION OF THE DRAWINGS

FIG. 5 shows a flowchart presenting an exemplary method for performing automated saliency prioritization for image processing, according to one implementation.

DETAILED DESCRIPTION

Figure 1:
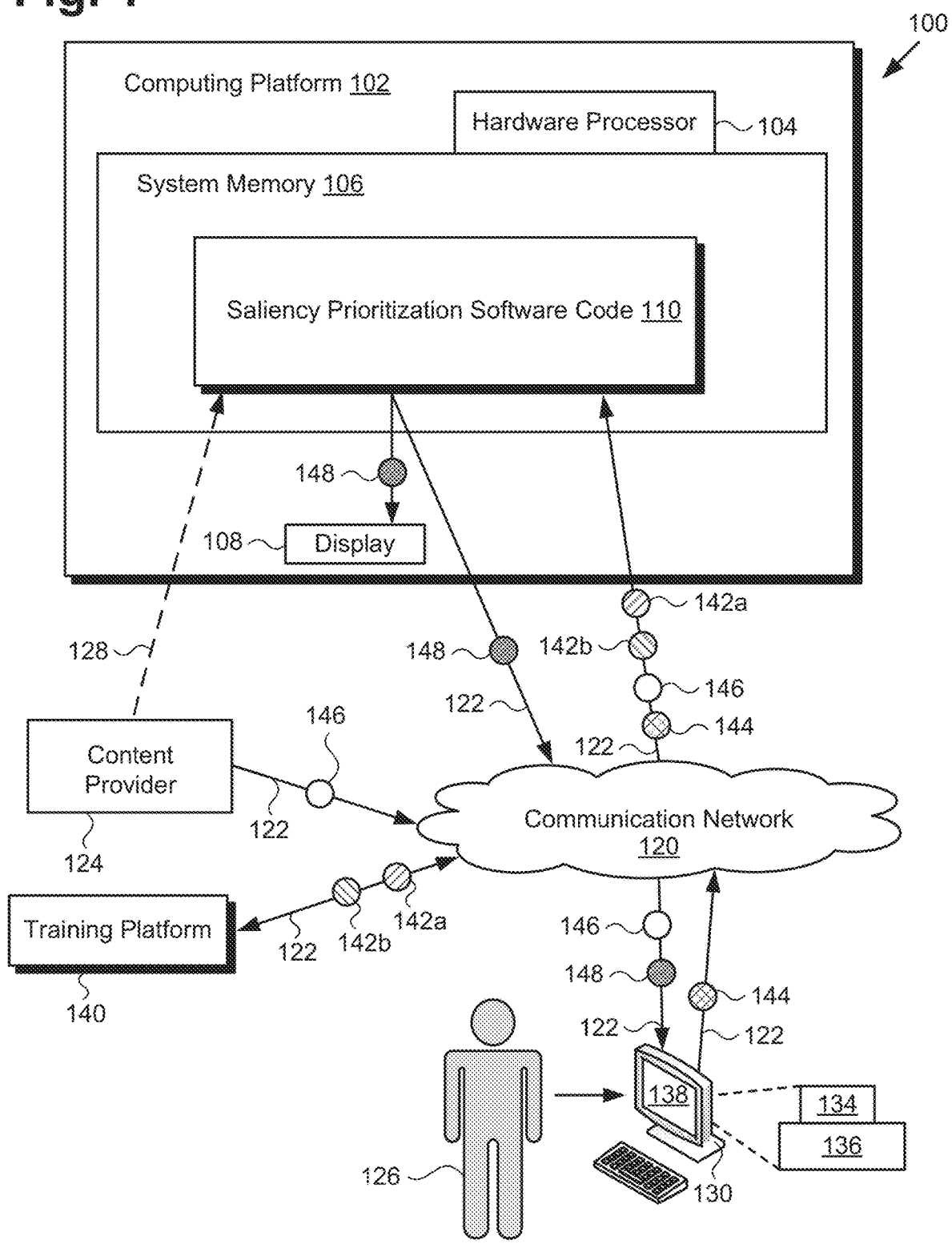
FIG. 1 shows a diagram of exemplary systems for performing automated saliency prioritization for image processing, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing automated saliency prioritization for image processing that overcome the drawbacks and deficiencies in the conventional art. It is noted that although the present saliency prioritization solution is described below in detail by reference to the exemplary use case of detecting pixel anomalies in images such as digital photographs and frames of video, the present novel and inventive principles may more generally find other applications to automation within a video or other image processing pipeline.

As applied to the specific use case of saliency prioritization for pixel anomalies in images, the present application discloses two different approaches to saliency prioritization that may be used as alternative approaches, or that may be used in combination. In one such approach (hereinafter referred to as "character and foreground object masking"), the present solution identifies regions of an image that lie on or near a character or foreground object as salient regions of the image. In the other (hereinafter referred to as "attention mapping"), the present solution identifies regions of an image that can be predicted to receive more attention by an observer of the image as salient regions of the image. In both approaches, the present solution prioritizes the saliency of pixel anomalies based on their respective locations inside or outside of the salient regions of the image. Those salient regions may be identified using character and foreground masks, or based on attention scores assigned to individual pixels within the image, for example. Pixel anomalies determined to be located inside a salient region are prioritized for correction over pixel anomalies determined not to be located inside a salient region. Moreover, in some use cases, pixel anomalies determined not to be located inside a salient region of an image may be disregarded.

It is further noted that, regarding the concept of pixel anomaly salience or saliency, a review of image saliency detection and determination is described in the publication titled "Review of Visual Saliency Detection with Comprehensive Information," by Cong et al. (see Runmin Cong, Jianjun Lei, Huazhu Fu, Ming-Ming Cheng, Weisi Lin, and Qingming Huang, IEEE Transactions on Circuits and Systems for Video Technology, Vol. 29, Issue. 10, October 2019), which is hereby incorporated fully by reference into the present application.

It is also noted that the methods disclosed by the present application may be performed as substantially automated processes by substantially automated systems. As used in the present application, the terms "automation," "automated," and "automating" refer to systems and processes that do not require the participation of a human user. Although, in some implementations, a human inspector may review the performance of the automated systems described herein, that human involvement is optional. Thus, the methods described in the present application may be performed under the control of hardware processing components of the disclosed automated systems.

Moreover, as defined in the present application, an artificial neural network, also known simply as a neural network (NN), is a type of machine learning framework in which patterns or learned representations of observed data are processed using highly connected computational layers that map the relationship between inputs and outputs. A "deep neural network" (deep NN), in the context of deep learning, may refer to a neural network that utilizes multiple hidden layers between input and output layers, which may allow for learning based on features not explicitly defined in raw data. NNs may be designed to progressively improve their performance of a specific task as new data is received and to adapt to new patterns of a dynamic system. As such, various forms of NNs may be used to make predictions about new data based on past examples or "training data." In various implementations, NNs may be utilized to perform image processing or natural-language processing.

FIG. 1 shows a diagram of exemplary systems for performing automated saliency prioritization for image processing, according to one implementation. As shown in FIG. 1, system 100 includes computing platform 102 having hardware processor 104, system memory 106 implemented as a non-transitory storage device storing saliency prioritization software code 110, and may include display 108. It is noted that display 108, when included in system 100, may be implemented as a liquid crystal display (LCD), a light-emitting diode (LED) display, an organic light-emitting diode (OLE) display, a quantum dot (QD) display, or any other suitable display screen that performs a physical transformation of signals to light.

Figure 3:
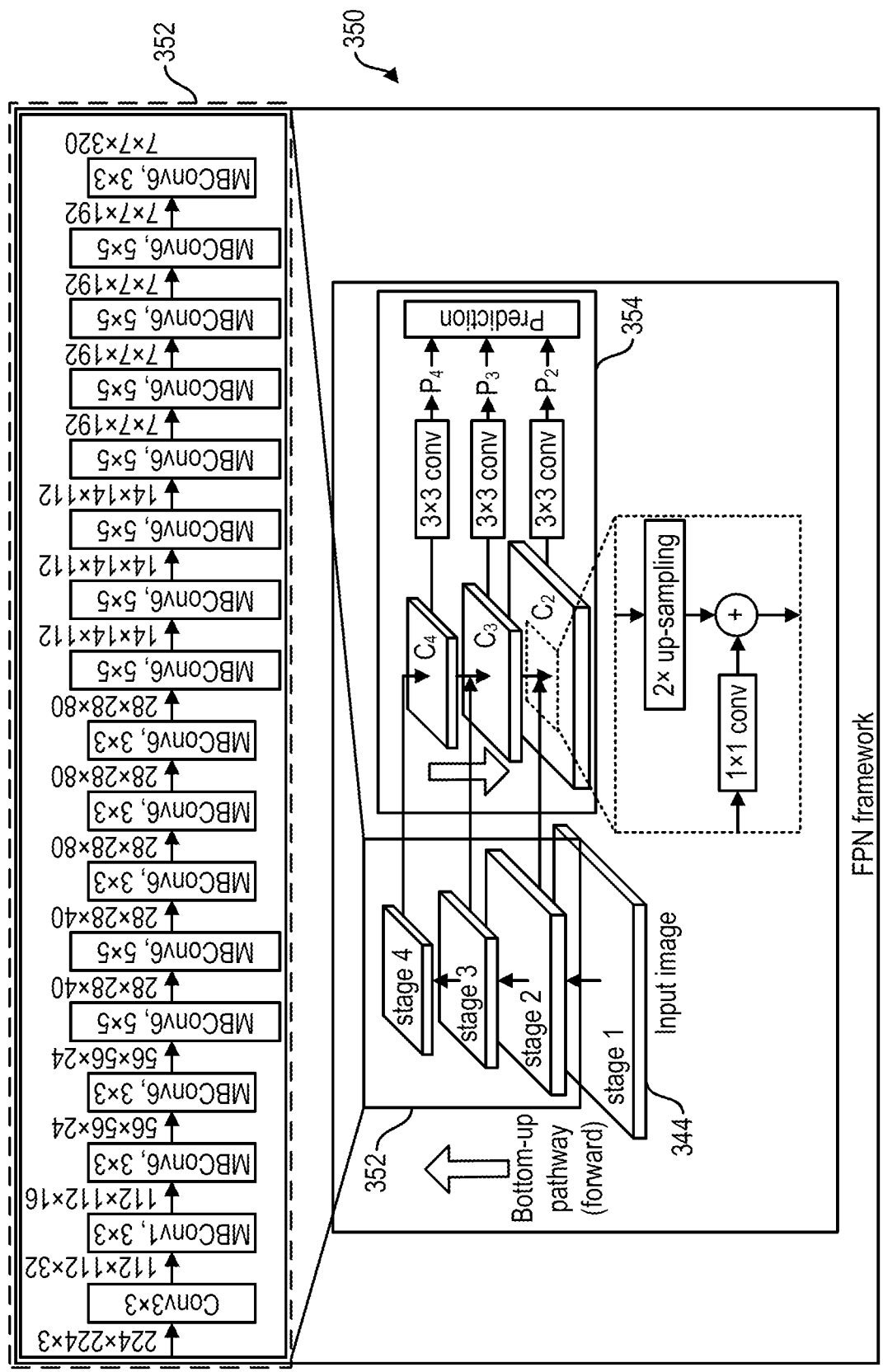
FIG. 3 shows an exemplary trained neural network (NN) included in the software code shown in FIGS. 1 and 2, according to one implementation.
Figure 4:
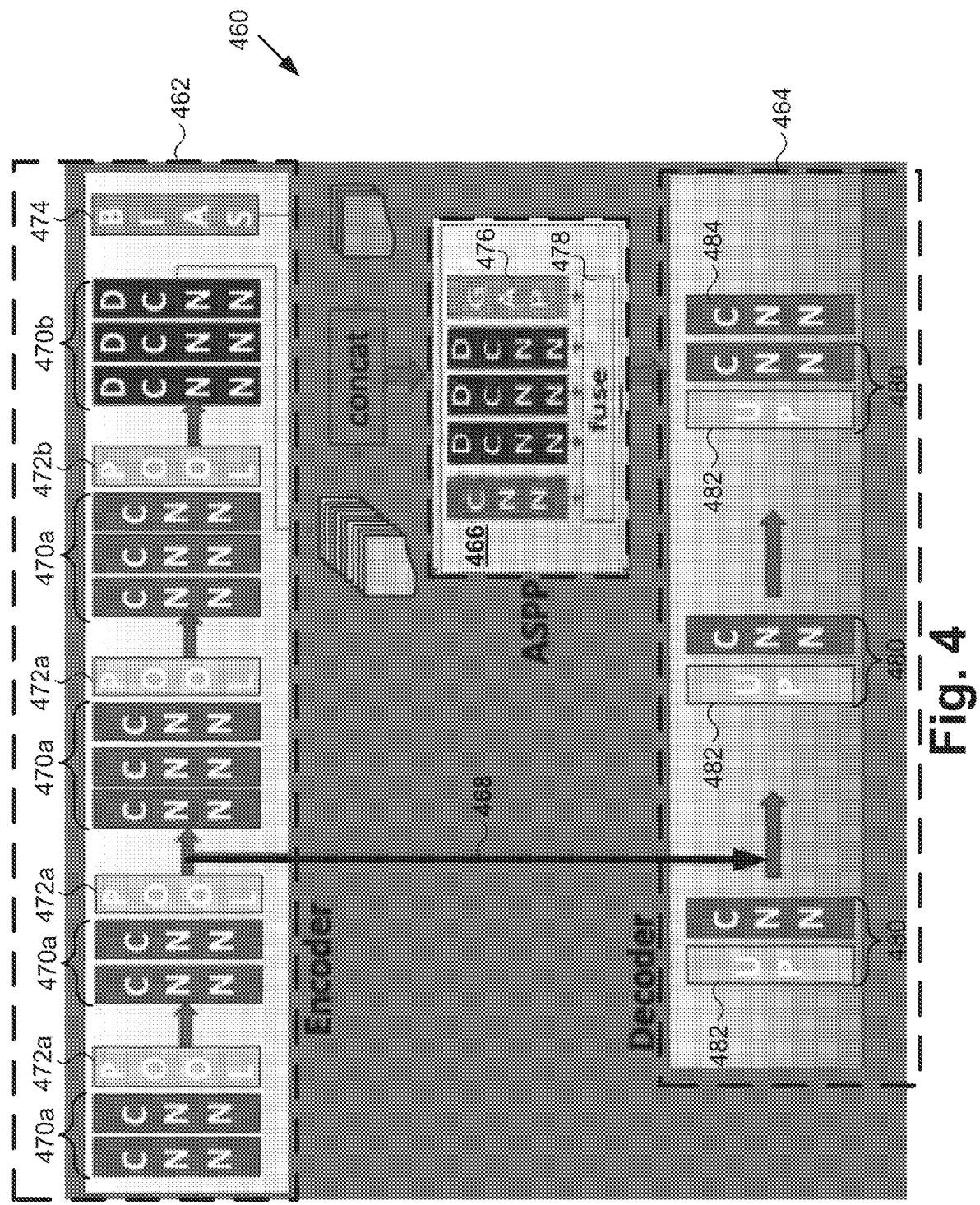
FIG. 4 shows an exemplary trained NN included in the software code shown in FIGS. 1 and 2, according to another implementation.

It is also noted that, as shown by FIGS. 3 and 4 and described below, saliency prioritization software code 110 includes one or more trained NNs, which may be configured to identify one or more salient regions of input image 144 to system 100. As further shown in FIG. 1, system 100 is implemented within a use environment including content provider 124 providing content 146 including input image 144, training platform 140 providing training datasets 142a and 142b, communication network 120, user system 130 including display 138 configured to be utilized by user 126 and optional user system hardware processor 134 and user system memory 136, to interact with system 100.

Also shown in FIG. 1 are network communication links 122 communicatively coupling content provider 124, training platform 140, and user system 130 with system 100 via communication network 120, as well as alert 148 flagging one or more pixel anomalies as salient based on their locations within input image 144 or an attention score predicted for one or more pixels that include the pixel anomaly. It is noted that although system 100 may receive content 146 from content provider 124 via communication network 120 and network communication links 122, in some implementations, content provider 124 may take the form of a content database integrated with computing platform 102, or may be in direct communication with system 100 as shown by dashed communication lint 128.

Saliency prioritization software code 110, when executed by hardware processor 104 of computing platform 102, is configured to receive input image 144 and to output alert 148 to user 126 wheal appropriate in view of the saliency of one or more pixel anomalies included in input 144. It is noted that although the present application refers to saliency prioritization software code 110 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of computing platform 102, or to optional user system hardware processor 134 of user system 130. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts training platform 140 as a computer platform remote from system 100, that representation is also merely exemplary. More generally, system 100 may include one or more computing platforms, such as computer servers for example, which may form an interactively linked but distributed system, such as a cloud-based system, for instance. As a result, hardware processor 104 and system memory 106 may correspond to distributed processor and memory resources within system 100, while training platform 140 may be a component of system 100 or may be implemented as a software module stored in system memory 106. In one implementation, computing platform 102 of system 100 may correspond to one or more web servers, accessible over a packet-switched network such as the Internet, for example. Alternatively, computing platform 102 may correspond to one or more computer servers supporting a wide area network (WAN), a local area network (LAN), or included in another type of limited distribution or private network.

User 126 may utilize user system 130 to interact with system 100 to submit input image 144 for analysis by saliency prioritization software code 110, executed by hardware processor 104, and, in some implementations, to receive alert 148 generated by saliency prioritization software code 110. It is noted that, in various implementations, alert 148, when generated using saliency prioritization software code 110, may be displayed on display 108, may be stored in memory 106, may be copied to non-volatile storage, or may be stored in memory 106 and also be copied to non-volatile storage. Alternatively, or in addition, as shown in FIG. 1, in some implementations, alert 148 may be sent to user system 130 including display 138, for example by being transferred via network communication links 122 of communication network 120.

In some implementations, saliency prioritization software code 110 may be utilized directly by user system 130. For example, saliency prioritization software code 110 may be transferred to user system memory 136, via download over communication network 120, for example, or via transfer using a computer-readable non-transitory medium, such as an optical disc or FLASH drive. In those implementations, saliency prioritization software code 110 may be persistently stored on user system memory 136, and may be executed locally on user system 130 by user system hardware processor 134.

Although user system 130 is shown as a desktop computer in FIG. 1, that representation is provided merely as an example. More generally, user system 130 may be any suitable mobile or stationary computing device or system that implements data processing capabilities sufficient to provide a user interface, support connections to communication network 120, and implement the functionality ascribed to user system 130 herein. For example, in some implementations, user system 130 may take the form of a laptop computer, tablet computer, or smartphone, for example. However, in other implementations user system 130 may be a "dumb terminal" peripheral component of system 100 that enables user 126 to provide inputs via a keyboard or other input device, as well as to view alert 148 on display 138. In those implementations, user system 130 and display 138 may be controlled by hardware processor 104 of system 100. Alternatively, in some implementations, user 126 may utilize user system hardware processor 134 of user system 130 to execute saliency prioritization software code 110 stored in user system memory 136, thereby generating alert 148 locally on user system 130.

With respect to display 138 of user system 130, display 138 may be physically integrated with user system 130 or may be communicatively coupled to but physically separate from user system 130. For example, where user system 130 is implemented as a smartphone, laptop computer, or tablet computer, display 138 will typically be integrated with user system 130. By contrast, where user system 130 is implemented as a desktop computer, display 138 may take the form of a monitor separate from user system 130 in the form of a computer tower. Furthermore, display 138 of user system 130 may be implemented as an LCD, an LED display, an OLED display, a QD display, or any other suitable display screen that performs a physical transformation of signals to light.

By way of overview, a pixel or pixels within an image may be identified as anomalous, i.e., having a defect, according to its context. For example, a human observer would typically identify an image region corresponding to one or more pixels as anomalous based on its color relative to surrounding pixels in the image. If, subjectively to the human observer, the image region color appears to vary too much from its surroundings, an anomaly is suspected. As noted above, in the conventional art, pixel anomaly detection is usually performed by human inspectors. Generally, those human inspectors are tasked with checking every single frame of each video several hundreds of times before its final distribution. Due to this intense reliance on human participation, the conventional approach to pixel error detection and correction is expensive and time consuming.

Moreover, and as further noted above, not all pixel anomalies require correction. For example, depending on its position in the foreground or background of an image, as well as its relationship to particularly important features, primary characters, or high attention regions within the image, some pixel anomalies may reasonably be disregarded. That is to say, not all pixel errors are sufficiently salient to justify the costs associated with their correction. Accordingly, system 100, or user system 130, can be configured to accurately assess the salience of pixel anomaly errors detected in input image 144 and to generate alert 148 flagging only those pixel anomalies that satisfy a saliency prioritization criterion.

Figure 2:
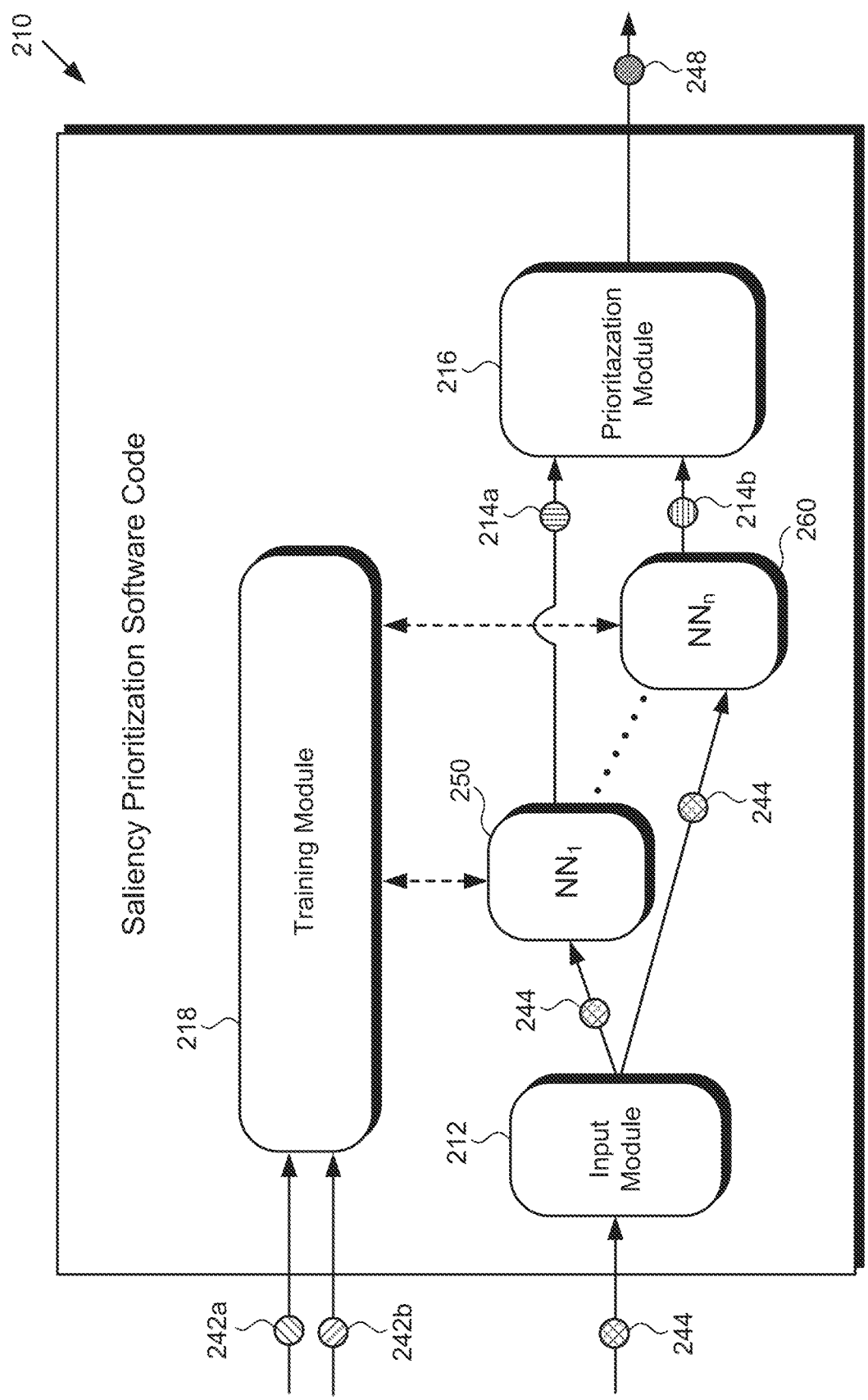
FIG. 2 shows a diagram of an exemplary software code suitable for execution by the hardware processors of the systems shown in FIG. 1, according to one implementation.

Referring now to FIG. 2, FIG. 2 shows a diagram of an exemplary software code suitable for execution by the hardware processors of the systems shown in FIG. 1, according to one implementation. As shown in FIG. 2, saliency prioritization software code 210 includes input module 212, one or more trained NNs including at least one of trained NN 250 providing saliency data 214*a* or trained NN 260 providing saliency data 214*b*, prioritization module 216, and training module 218 for training one or more of NNs 250 and 260. In addition, FIG. 2 shows training dataset 242*a* for training NN 250, training dataset 242*b* for training NN 260, input image 244, and alert 248.

Saliency prioritization software code 210, training datasets 242*a* and 242*b*, and alert 248 correspond respectively in general to saliency prioritization software code 110, training datasets 142*a* and 142*b*, and alert 148, in FIG. 1. That is to say, saliency prioritization software code 110, training datasets 142*a* and 142*b*, and alert 148 may share any of the characteristics attributed to respective saliency prioritization software code 210, training datasets 242*a* and 242*b*, and alert 248 by the present disclosure, and vice versa. Thus, although not shown explicitly shown in FIG. 1, saliency prioritization software code 110 may include features corresponding to each of input module 212, one or more trained NNs including at least one of trained NN 250 or trained NN 260, prioritization module 216, and training module 218 for training one or more of NNs 250 and 260.

In addition, input image 244 corresponds in general to input image 144, in FIG. 1. In other words, input image 244 may share any of the characteristics attributed to input image 144 by the present disclosure, and vice versa. It is noted that input image 144/244 may be a still image, such as a digital photograph or image, or may be a single frame of video depicting animation, television content, movie content, educational content, or sports, to name a few examples.

As noted above, the present application discloses two different approaches to saliency prioritization that may be used as alternative approaches or that may be used in combination, and are referred to herein as character and foreground object masking, and attention mapping, respectively. The first approach, i.e., character and foreground object masking, is described in greater detail below by further reference to FIG. 3, while the second approach, i.e., attention mapping, is described in detail below by further reference to FIG. 4.

Character and Foreground Object Masking:

In character and foreground object masking, saliency mask object detection trained NN 250 is utilized to solve the problem of automatically detecting salient regions of an input image, such as a frame of video, digital photograph, or other digital image, for example. At a high level, according to this use case, saliency prioritization software code 110/210 may be executed by hardware processor 104 of computing platform 102, or by user system hardware processor 134 of user system 130, to receive a single input image and to use trained NN 250 to produce saliency data 214*a* in the form of a binary mask. According to one implementation, each pixel of the binary mask is represented by a one (1) or a zero (0): 1 being assigned to pixels located inside salient regions of input image 144/244 and 0 being assigned to pixels not located inside such salient regions. Salient regions include pixels on characters and foreground objects represented in input image 144/244, but do not include pixels on background settings or background objects. Each salient region may then be expanded to include a predetermined number or percentage of adjacent pixels to ensure that pixels near a character or foreground object, as well as pixels that lie on the character or foreground object receive saliency prioritization.

FIG. 3 shows exemplary trained NN 350 suitable for use in performing character and foreground object masking, according to one implementation. As shown in FIG. 3, trained NN 350 may be implemented using a feature-pyramid-network (FPN) architecture, as known in the art, which, according to the present exemplary implementation, includes encoder 352 and decoder 354. Moreover, according to the exemplary implementation shown in FIG. 3, encoder 352 is implemented as an EfficientNet encoder, as known in the art, within the FPN architecture of trained NN 350. However, it is noted that in other implementations, encoder 352 may take the form of a Visual Geometry Group (VGG) encoder or a residual neural network (ResNet) encoder, both of which are also know in the art. Also shown in FIG. 3 is input image 344.

As depicted in FIG. 3, encoder 352 of trained NN receives input image 344 and down-samples input image 344 to produce a feature map. For example, input mage 344 received at stage 1 of encoder 352 having a resolution of 448×448 pixels may be down-sampled to a resolution of 24×24 pixels at stage 4. With respect to the four stage encoder design depicted in FIG. 3, it is noted that although other designs may be utilized, four stages balances efficiency and effectiveness. For example, the use of more than four stages may make it difficult to detect small targets (e.g., pixel size less than 32). Conversely, fewer than four stages may result in the resolution resulting from the final stage being too large for a typically sized NN kernel to capture global information due to the receptive field being undersized.

Decoder 354 of trained NN 350 up-samples the output of encoder 352 to produce a mask having the same resolution as that of input image 344. As indicated by the presence of layers $C_4$, $C_3$, and $C_2$ in FIG. 3, exemplary decoder 354 is also implemented using four layers. Although more layers, and thus greater resolution, can confer performance benefits, it can also greatly increase the computation cost. As with the four stage encoder design discussed above, the four stage decoder design represented in FIG. 3 design advantageously balances performance and efficiency.

Trained NN 350 corresponds in general to trained NN 250, in FIG. 2, and those corresponding features may share any of the characteristics attributed to either corresponding feature by the present disclosure. Thus, like trained NN 350, trained NN 250 may include features corresponding respectively to encoder 352 implemented as an EfficientNet encoder, and decoder 354. In addition, input image 344 corresponds in general to input image 144/244 in FIGS. 1 and 2. Consequently, input image 344 may share any of the characteristics attributed to input image 144/244 by the present disclosure, and vice versa.

Trained NN 250/350 may be trained on public or private saliency mask datasets including video frames, digital photographs, and other digital images, and may be validated on a separate, manually annotated dataset. For example, initial training may occur on a public dataset, while fine tuning and validation may be occur on a private dataset. In some implementation, one or more of contrast and motion blur may be additional parameters utilized during training of trained NN 250/350. Moreover, in some implementations, trained NN 250/350 may be trained using a hybrid loss function that blends cross-entropy (CE) loss with Sørensen-Dice coefficient based Dice loss, as those losses are known in the art.

Regarding the issues of contrast and motion blur, it is noted that, data augmentation techniques may be used to solve domain shift problems. For example, video frames from professionally produced movie or television content typically undergo considerable post-processing to adjust contrast and correct for motion blur. However, images included in public datasets used during training may include amateur digital images, such as selfies for example, which lack such post-processing refinements. As a result, it may be advantageous or desirable to utilize motion blur and contrast parameters during training on public datasets to avoid domain shift problems, e.g., training that results in good performance on selfie images but poor performance on professionally produced video frames, digital photographs, and other digital images.

Attention Mapping:

Human visual studies have revealed that the locations on an image that an observer of the image tends to focus on do not always coincide with the full outline of a character or object. Instead, human observers have a natural bias to pay greater attention to faces, and there is an additional upper center bias in which observers tend to pay greater attention to the upper middle portion of a display screen.

Trained NN 260 may be utilized to automatically map the spectrum of attention for an entire input image, such as a frame of video, digital photograph, or other digital image, for example. According to this use case, saliency prioritization software code 110/210 may be executed by hardware processor 104 of computing platform 102, or by user system hardware processor 134 of user system 130, to receive a input image 144/244 and to use trained NN 260 to produce saliency data 214b in the form of an attention map of input image 144/244. According to one implementation, each pixel of the attention map is assigned an attention score ranging from 0.0 to 1.0, where 1.0 represents regions of highest attention, i.e., salient regions, 0.0 represents regions of lowest attention, and float points between 0.0 and 1.0 representing the gradient between the two extremes based on predetermined thresholds corresponding respectively to different levels of saliency.

FIG. 4 shows exemplary trained NN 460 suitable for use in performing attention mapping, according to one implementation. As shown in FIG. 4, trained NN 460 may be implemented using a fully-convolutional encoder-decoder network including encoder 462, decoder 464, Atrous Spatial Pyramid Pooling (ASPP) module 466, and shortcut-connection 468 between encoder 462 and decoder 464. According to the exemplary implementation shown in FIG. 4, encoder 462 is implemented as a dilated VGG encoder, as described below.

One drawback of conventional VGG encoding is that the down-sampling of the input image reduces spatial accuracy for pixel-wise prediction. In order to overcome that limitation of conventional VGG encoding, the present disclosure introduces an exemplary dilated VGG. Starting with a conventional VGG encoder architecture, the three fully connected layers and the last pooling layer may be removed. This may result in five blocks of convolutional NNs (CNNs), e.g., four CNN blocks 470a and single block 470b in FIG. 4. The last remaining pooling layer, i.e., pooling layer 472b, is modified by using a stride of 1 instead of 2. That is to say the original pooling configured as 2*2 with stride 2 is modified so as to be implemented as 2*2 with stride 1, which keeps high resolution information (e.g., the size of 1=8 in the input image instead of 1=32). A consequence of the removal and modification of the pooling layers is that the receptive field decreases. To address that issue, last CNN block 470b is implemented using three dilated. CNN layers (DCNN layers), as known in the art, with a rate of 2. The DCNN layers increase the receptive field to benefit the extraction of global features without introducing extra parameters or reducing feature resolutions.

Continuing to refer to FIG. 4, each of the layers marked as CNN, but excluding those marked DCNN, represents a 3*3 convolutional layer with a stride of 1, and each layer marked DCNN represents a 3*3 dilated convolutional layer with a rate of 2. Each of pooling layers 472a represents a 2*2 max pooling layer with a stride of 2, while pooling layer 472b represents a 2*2 max pooling layer with a stride of 1. Exemplary bias layer 474 utilizes a set of sixteen predefined. Gaussian maps to embed the center-bias into the model, although in other implementations, more, or fewer than sixteen Gaussian maps may be used. According to the present exemplary implementation, the Gaussian maps are concatenated with the output of the encoder to form 1296-channel features feeding into the ASPP module 466. Thus, as defined for the purposes of the present application, a dilated VGG encoder refers to a modified VGG encoder including at least CNN block 470b having multiple DCNN layers, and may include any other features attributed to encoder 462 by the present disclosure.

The fusion of multi-scale features is important to capture, both global and local contextual information of saliency. The ASPP module has demonstrated powerful multi-scale feature extraction capacity and also has the capability to harvest long-range dependencies via dilated convolutions. According to the exemplary implementation shown in FIG. 4, feature fusion module 466 as an ASPP module, may be composed of five parallel blocks including a 1*1 CNN layer, three 3*3 DCNN layers with rates of 6, 12, and 18 respectively, and global average pooling (GAP) layer 476 configured to obtain the global context information of images by fusing image-level semantics. The outputs of these five blocks are concatenated into 1280-channel features. A non-linear fusion may then be applied to those features using fusion layer 478 implemented as a 1*1 CNN layer in order to form a 256-channel feature map feeding into decoder 464. It is noted that although ASPP modules typically include five parallel blocks, as described above, the number of dilation rates and the number of output channels can vary.

Decoder 464 is used to restore the spatial size of feature maps to the spatial size of the initial input. There are some fully convolutional network based methods, which directly use bilinear or bicubic interpolation for this up-sampling step. However, decoder 464 is modified according to the present implementation through addition of a skip connection in the form of shortcut-connection 468 that merges information from shallow to deep layers so that NN 460 can transfer fine-grained image details to the final saliency prediction. That is to say, shortcut-connection 468 is formed between a shallow encoder layer of dilated VGG encoder 462 and a decoder layer of decoder 464.

As shown in FIG. 4, the output of ASPP module 466 may be fed into a series of up-sampling and CNN layers. Consequently, a saliency prediction having the same size as input image 144/244 may be produced. As further shown in FIG. 4, and merely by way of example, decoder 464 may be composed of 4 blocks: three sequences 480 of bilinear up-sampling layer 482 with a factor of 2 and 3*3 CNN layer, and 3*3 CNN layer 484 with the output channel of 1.

Trained NN 460 corresponds in general to trained NN 260, in FIG. 2, and those corresponding features may share any of the characteristics attributed to either corresponding feature by the present disclosure. Thus, like trained NN 460, trained NN 260 may include features corresponding respectively to encoder 462 implemented as a dilated VGG encoder, decoder 464, ASPP module 466, and shortcut-connection 468.

Trained NN 260/460 may be trained on public or private datasets, or on a combination of public and private datasets, and eye tracking data. That is to say, trained NN 260/460 may be trained using training dataset 142b/242b including multiple training data pairs, where each of the training data pairs includes an image and an eye tracking data obtained based on observation of the image by multiple human observers. For example, in one implementation, six to eight observers were recruited to watch each image for three seconds. One thousand images were divided into five groups with two hundred images in each group. Each image was annotated with fixation points revealed by the eye tracker. The annotation started from the calibration of the eye tracker to ensure tracking accuracy. During the annotation, each observer was asked to sit in front of a display screen keeping their head as still as possible. As a result, fixation points (e.g., x-y coordinates within the image) were then recorded in a comma-separated values (.csv) file.

Trained NN 260/460 may be trained using a Kullback-Leibler (KL) divergence-based loss function. To measure the distribution difference between prediction and ground truth, such a KL divergence-based loss function (also "KL-Div") may be defined as:

$$KL(P, G) = \sum_i G_i \log\left(\epsilon + \frac{G_i}{\epsilon + P_i}\right),$$

where P and G represent the predicted and ground truth saliency maps, respectively, and i denotes a pixel in an image domain. KL-Div is a dissimilarity metric, such that a lower value indicates a better prediction.

It is noted there are other measurements for evaluating the distribution difference that can be used as the loss function to train trained NN 260/460 to produce a prediction approaching the ground truth, such as the linear correlation coefficient (CC), for example. However, KL-Div has the advantage in the present use case of imposing more punishment on false negatives and consequently encourages a densely clustered distribution that meets the present saliency prioritization objectives. It is noted that there are two particularly important aspects of attention mapping accuracy. First, false negatives should be minimized (i.e., regions, such as individual pixels or groups of pixels, that are predicted to have low attention scores but in fact are high attention regions). Second, one or more high attention pixels in the image should be correctly identified as such (i.e., regions such as individual pixels or groups of pixels where a high attention score is predicted is in fact a high attention area, and that it is the proper general shape). It is to be expected that the boundary edges of the predicted high attention region may over-include one or two pixels, but that would merely result in those boundary edges including medium-high attention pixels rather than exclusively highest attention pixels. Functionally there is no significant effect on performance whether the boundary pixels are identified as high attention or medium-high attention, as long as the region(s) of high-to-medium-high attention is/are in the right space and have the appropriate general shape.

The functionality of saliency prioritization software code 110/210 will be further described by reference to FIG. 5, in combination with FIGS. 1 and 2. FIG. 5 shows flowchart 590 presenting an exemplary method for performing automated salience assessment of pixel anomalies, according to one implementation. With respect to the method outlined in FIG. 5, it is noted that certain details and features have been left out of flowchart 590 in order not to obscure the discussion of the implementations described in the present application.

Flowchart 590 begins with receiving input image 144/244 including at least one pixel anomaly (action 591). By way of example, and as shown by FIGS. 1 and 2, in one implementation, user 126 may utilize user system 130 to interact with system 100 in order to assess the salience of one or more pixel anomalies included in input image 144/244, which may be a digital photograph, video frame, or other digital image, for instance. As further shown by FIG. 1, user 126 may transmit input image 144/244 from user system 130 to computing platform 102 of system 100 via communication network 120 and network communication links 122. Alternatively, input image 144/244 may be received from content provider 124, or may be stored in system memory 106. As yet another alternative, in some implementations user 126 may utilize user system 130 to assess the salience of one or more pixel anomalies included in input image 144/244 locally, using the processor and memory resources of user system 130. In those implementations, input image 144/244 may be obtained from user system memory 136 of user system 130. Action 591 may be performed using input module 212 of saliency prioritization software code 110/

210, executed by hardware processor 104 of system 100, or by user system hardware processor 134 of user system 130.

It is noted that, in some implementations, action 591 may include analyzing input image 144/244 for the presence of the one or more pixel anomalies. However, in other implementations, the one or more pixel anomalies included in input image 144/244 may have been previously identified by another system configured to perform that task. Detection of the one or more pixel anomalies in input image 144/244 may be performed using any suitable pixel error detection method, including, but not limited to the methods described by U.S. patent application Ser. No. 16/243,650, filed on Jan. 9, 2019 and titled "Pixel Error Detection System," or by U.S. patent application Ser. No. 16/836,453, filed on Mar. 31, 2020, and titled "Automated. Pixel Error Detection Using an Inpainting Neural Network," both of which documents are incorporated fully by reference into the present application.

Flowchart 590 continues with identifying, using one or more of the trained NNs included in saliency prioritization software code 110/210, one or more salient regions of input image 144/244 (action 592). In some implementations, the one or more salient regions of input image 144/244 may be identified by trained NN 250/350 using the character and foreground object masking technique described above by reference to FIG. 3. Alternatively, or in addition, in some implementations, the one or more salient regions of input image 144/244 may be identified by trained NN 260/460 using the attention mapping technique described above by reference to FIG. 4.

In implementations in which the one or more salient regions of input image 144/244 are identified by trained NN 260/460 using the attention mapping technique described above, those one or more salient regions may be identified as such based on a respective attention score predicted for each pixel in the one or more salient regions by trained NN 260/460. By way of example, in one implementation, salient regions may be identified based on the presence within those regions of pixels having a predicted attention score satisfying a predetermined threshold, such as 0.85 in a range from 0.0 to 1.0, where 1.0 corresponds to highest attention and 0.0 corresponds to lowest attention. It is noted that, in some implementations, the one or more salient regions identified by trained NN 260/460 may consist of a single pixel.

Thus, in some implementations, one of trained NNs 250/350 or 260/460 may be used in action 592, while in other implementations, multiple trained NNs included in saliency prioritization software code 110/210, such as trained NN 250/350 and trained NN 260/460 may be used in combination to identify the one or more salient regions of input image 144/244. It is noted that the character and foreground object masking technique implemented by trained NN 250/350 can answer whether a pixel anomaly is salient or not based on its coordinates within an input image. The attention mapping technique implemented by trained NN 260/460 can answer how salient a single anomalous pixel. The character and foreground masking technique can output a binary mask having a resolution that is the same as that of the input image, where locations labeled 1 are denoted as salient, while regions label 0 are not. The attention map technique can output a heat map with floating values in a range from 0.0 to 1.0, where 1.0 denotes highest saliency, 0.0 denotes absence of saliency, and float values in between can denote various levels of saliency based on predetermined threshold values. To combine the two approaches, the final saliency determination may be a weighted sum of the binary mask and the attention heat map, e.g., output=a*binary mask+b*attention heat map, where a and b are predetermined weights. Action 592 may be performed by saliency prioritization software code 110/210, executed by hardware processor 104 of system 100, or by user system hardware processor 134 of user system 130.

Flowchart 590 continues with determining whether the pixel anomaly is located inside any of the one or more salient regions of input image 144/244 (action 593). Action 593 may be performed using prioritization module 216 of saliency prioritization software code 110/210, executed by hardware processor 104 of system 100, or by user system hardware processor 134 of user system 130, and based on one or both of saliency data 214a and saliency data 214b output by respective trained NNs 250/350 and 260/460.

According to the exemplary method outlined in FIG. 5, flowchart 590 continues with assigning a first priority to the pixel anomaly when the determining performed in action 593 determines that the pixel anomaly is located inside any of the one or more salient regions of input image 144/244 (action 594). Action 594 may be performed using prioritization module 216 of saliency prioritization software code 110/210, executed by hardware processor 104 of system 100, or by user system hardware processor 134 of user system 130.

In some implementations, flowchart 590 can conclude with assigning a second priority, lower than the first priority assigned in action 594, to the pixel anomaly when the determining performed in action 593 determines that the pixel anomaly is not located inside any of the one or more salient regions of the input image (action 595). Action 595 may be performed using prioritization module 216 of saliency prioritization software code 110/210, executed by hardware processor 104 of system 100, or by user system hardware processor 134 of user system 130.

With respect to pixel anomalies located at the boundary of a salient region, it is noted that the priority of such an anomaly can vary depending on how the boundary is defined. In the character and foreground object masking technique, for example, in some implementations, a region identified as salient may extend beyond the borders of the character or foreground object being masked, while in other implementation the salient region boundary may substantially match the border of the character or foreground object. In implementations in which the salient region extends beyond the border of the character or foreground object, pixel anomalies at the boundary of the salient region may be assigned the second priority. However, in implementations in which the salient region boundary substantially matches the the border of the character or foreground object, pixel anomalies at the boundary of the salient region may be assigned the first priority.

It is further noted that although the exemplary method outlined by flowchart 590 describes action 594 as preceding action 595, that sequence is provided merely as an example. In various implementations of the present method, action 594 may precede action 595, action 594 may follow action 595, or actions 594 and 595 may be performed substantially concurrently.

As stated above, in some implementations flowchart 590 can conclude with action 595 described above. However, in other implementations, flowchart 590 may continue with optionally flagging the pixel anomaly for correction by user 126 when the pixel anomaly is assigned the first priority in action 594 (action 596). As discussed above, some pixel anomalies in input image 144/244 may be sufficiently salient, based for example on their location in input image 144/244 or their proximity to a character or foreground object in input image 144/244, to justify the time and cost associated with their correction. Thus, those pixel anomalies assigned the first priority in action 594 may be flagged in input image 144/244 and may be included in alert 148/248 output by prioritization module 216 of saliency prioritization software code 110/210. Thus, optional action 596 may result in generation of alert 148/248, and may be performed by saliency prioritization software code 110/210, executed by hardware processor 104 of system 100, or by user system hardware processor 134 of user system 130.

In implementations in which the one or more salient regions of input image 144/244 are identified by trained NN 260/460 using the attention mapping technique described above, alert 148/248 may include a full attention heatmap of input image 144/244. For example, pixels having a predicted attention score from 0.85 to 1.0 may have a red overlay, those with a predicted attention score of from 0.75 to 0.84 may have an orange overlay, and so forth as pixels having progressively lower predicted attention scores are overlaid by progressively cooler colors. Alternatively, in some implementations, it may be advantageous or desirable for alert 148/248 to display each identified pixel to the user along with the raw attention score predicted for that pixel by trained NN 260/460 based on its location within the full attention map of input image 144/244.

In some implementations, pixel anomalies assigned the second priority in action 595 may be reported in alert 148/248 without being affirmatively flagged for correction. In some of those implementations, the pixel anomalies assigned the second priority may be corrected at the discretion of user 126, or may be automatically corrected after all pixel anomalies assigned the first priority have been corrected. However, in other implementations, as shown in FIG. 5, the exemplary method outlined by flowchart 590 can continue and conclude with optionally disregarding the pixel anomaly when the pixel anomaly is assigned the second priority in action 595 (action 597). As discussed above, not all pixel anomalies in input image 144/244 may justify the time and cost associated with their correction. Thus, in some implementations, those pixel anomalies assigned the second priority in action 595 may be disregarded without substantially compromising the esthetics of input image 144/244. Action 597 may be performed using prioritization module 216 of saliency prioritization software code 110/210, executed by hardware processor 104 of system 100, or by user system hardware processor 134 of user system 130.

Although the exemplary method outlined by flowchart 590 describes flagging the pixel anomaly in input image 144/244 for correction by user 126 when the pixel anomaly is assigned the first priority, in optional action 596, followed by disregarding the pixel anomaly in input image 144/244 when the pixel anomaly is assigned the second priority, in optional action 597, that sequence is provided merely as an example. In various implementations of the present method, optional actions 596 and 597 may be performed substantially concurrently, optional action 597 may precede optional action 596, or one of optional actions 596 or 597 may be omitted.

With respect to the actions presented in flowchart 590, it is emphasized that, in various implementations, actions 591-595, or actions 591-595 and optional action 596, or actions 591-595 and optional action 597, or actions 591-595 and optional actions 596 and 597, may be performed in an automated process from which human involvement may be omitted.

Thus, the present application discloses systems and methods for performing automated saliency prioritization for image processing that overcome the drawbacks and deficiencies in the conventional art. The automated solution for prioritizing the salience of pixel anomalies disclosed in the present application improves on the state-of-the-art by enabling the efficient prioritization of pixel anomalies based on their respective locations within an image. The present solution further advantageously enables the identification of high priority pixel anomalies requiring corrections, as well as low priority pixel anomalies that, in some use cases can be disregarded without substantially impacting the esthetics of an image including the low priority pixel anomalies. Consequently, the present solution advantageously renders the correction of pixel anomalies both more efficient and less costly than conventional approaches.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a hardware processor; and
   a system memory storing a soft are code including a trained neural network (NN);
   the hardware processor configured to execute the software code to:
   receive an input image including a pixel anomaly;
   identify, using the trained NN, one or more salient regions of the input image;
   determine whether the pixel anomaly is located inside any of the one or more salient regions of the input image;
   assign a first priority to the pixel anomaly when determined that the pixel anomaly is located inside any of the one or more salient regions of the input image; and
   assign a second priority, lower than the first priority, to the pixel anomaly when determined that the pixel anomaly is not located inside any of the one or more salient regions of the input image.

2. The system of claim 1, wherein the hardware processor further executes the software code to flag the pixel anomaly for correction by a user of the system when the pixel anomaly is assigned the first priority.

3. The system of claim 1, wherein the hardware processor further executes the software code to disregard the pixel anomaly when the pixel anomaly is assigned the second priority.

4. The system of claim 1, wherein the trained NN comprises a feature-pyramid-network (FPN) architecture, and wherein the trained NN is trained using a hybrid loss function that blends a cross-entropy (CE) loss with a Sørensen-Dice coefficient based Dice loss.

5. The system of claim 1, wherein the trained NN comprises an encoder-decoder network architecture including a dilated Visual Geometry Group (VGG) encoder and a decoder, and wherein the trained NN is trained using a Kullback-Leibler (KL) divergence-based loss function and a training dataset comprising a plurality of training data pairs, and wherein each of the plurality of training data pairs includes an image and an eye tracking data obtained based on observation of the image by a plurality of human observers.

6. The system of claim 5, wherein the trained NN comprises a shortcut-connection between a shallow encoder layer of the dilated VGG encoder and a decoder layer of the decoder.

7. The system of claim 5, wherein the one or more salient regions of the input image are identified as such based on a respective attention score predicted for each pixel in the one or more salient regions by the trained NN.

8. The system of claim 7, wherein at least one of the one or more salient regions of the input image consists of a single pixel.

9. The system of claim 1, wherein the trained NN comprises a first trained NN and a second trained NN, the first trained NN comprising an FPN architecture, and the second trained NN comprising an encoder-decoder network architecture including a dilated VGG encoder.

10. The system of claim 9, wherein the first rained NN is trained using a hybrid loss function that blends a CE loss with a Sørensen-Dice coefficient based Dice loss, and the second trained NN is trained using a KL divergence-based loss function and a training dataset comprising a plurality of training data pairs, and wherein each of the plurality of training data pairs includes an image and an eye tracking data obtained based on observation of the image by a plurality of human observers.

11. A method for use by a system including a hardware processor and a system memory storing a software code including a trained neural network (NN), the method comprising:
receiving, by the software code executed by the hardware processor, an input image including a pixel anomaly;
identifying, by the software code executed by the hardware processor and using the trained NN, one or more salient regions of the input image;
determining, by the software code executed by the hardware processor, whether the pixel anomaly is located inside any of the one or more salient regions of the input image;
assigning a first priority to the anomalous pixel, by the software code executed by the hardware processor, when determined that the pixel anomaly is located inside any of the one or more salient regions of the input image; and
assigning a second priority, lower than the first priority, to the anomalous pixel, by the software code executed by the hardware processor, when determined that the pixel anomaly is not located inside any of the one or more salient regions of the input image.

12. The method of claim 11, further comprising:
flagging the anomalous pixel, by the software code executed by the hardware processor, for correction by a user of the system when the pixel anomaly is assigned the first priority.

13. The method of claim 11, further comprising:
disregarding the anomalous pixel, by the software code executed by the hardware processor, when the pixel anomaly is assigned the second priority.

14. The method of claim 11, wherein the trained NN comprises a feature-pyramid-network (FPN) architecture, and wherein the trained NN is trained using a hybrid loss function that blends a cross-entropy (CE) loss with a Sørensen-Dice coefficient based Dice loss.

15. The method of claim 11, herein the trained NN comprises an encoder-decoder network architecture including a dilated Visual Geometry Group (VGG) encoder and a decoder, and wherein the trained NN is trained using a Kullback-Leibler (KL) divergence-based loss function and a training dataset comprising a plurality of training data pairs, and wherein each of the plurality of training data pairs includes an image and an eye tracking data obtained based on observation of the image by a plurality of human observers.

16. The method of claim 15, wherein the trained NN comprises a shortcut-connection between a shallow encoder layer of the dilated VGG encoder and a decoder layer of the decoder.

17. The method of claim 15, herein the one or more salient regions of the input image are identified as such based on a respective attention score predicted for each pixel in the one or more salient regions by the trained NN.

18. The method of claim 15, wherein at least one of the one or more salient regions of the input image consists of a single pixel.

19. The method of claim 11, wherein the trained NN comprises a first rained NN and a second trained NN, the first trained NN comprising an FPN architecture, and the second trained NN comprising an encoder-decoder network architecture including a dilated VGG encoder.

20. The method of claim 19, wherein the first (rained NN is trained using a hybrid loss function that blends a CE loss with a Sørensen-Dice coefficient based Dice loss, and the second trained NN is trained using a KL divergence-based loss function and a training dataset comprising a plurality of training data pairs, and wherein each of the plurality of training data pairs includes an image and an eye tracking data obtained based on observation of the image by a plurality of human observers.

* * * * *